United States Patent
Moran, III et al.

(10) Patent No.: US 7,616,654 B2
(45) Date of Patent: Nov. 10, 2009

(54) SPECTRUM MANAGEMENT SYSTEMS AND METHODS FOR CABLE NETWORKS

(75) Inventors: John L. Moran, III, Millville, MA (US); Poth Boontor, Mansfield, MA (US); Michael Cooper, Marietta, GA (US)

(73) Assignee: General Instrument Corporation, Horsham, PA (US)

( * ) Notice: Subject to any disclaimer, the term of this patent is extended or adjusted under 35 U.S.C. 154(b) by 944 days.

(21) Appl. No.: 10/937,909

(22) Filed: Sep. 10, 2004

(65) Prior Publication Data

US 2005/0058082 A1 Mar. 17, 2005

Related U.S. Application Data

(60) Provisional application No. 60/502,077, filed on Sep. 11, 2003.

(51) Int. Cl.
*H04L 12/28* (2006.01)

(52) U.S. Cl. .................. 370/431; 370/329; 370/433

(58) Field of Classification Search .......... 370/328–330, 370/431–433
See application file for complete search history.

(56) References Cited

U.S. PATENT DOCUMENTS

| | | | | |
|---|---|---|---|---|
| 6,658,010 | B1 * | 12/2003 | Enns et al. ................. | 370/401 |
| 6,757,253 | B1 | 6/2004 | Cooper et al. | |
| 7,139,283 | B2 * | 11/2006 | Quigley et al. ............. | 370/432 |
| 2003/0002450 | A1 | 1/2003 | Jalali et al. | |
| 2003/0109261 | A1 * | 6/2003 | Razavilar et al. .......... | 455/452 |

FOREIGN PATENT DOCUMENTS

| | | |
|---|---|---|
| EP | 1341335 A2 | 9/2003 |
| WO | WO 00/54423 | 9/2000 |
| WO | WO-0054423 A1 | 9/2000 |

OTHER PUBLICATIONS

Jack Moran, "Moving Beyond the Standard: Creating Additional Bandwidth Through Extending DOCSIS 2.0", Web Page, pp. 1-8, http://broadband.motorola.com/nis/pdf/Extending_DOCSIS_2.pdf.
ADC Telecommunications, Inc., "ADC's Cuda 3000™ Next-Generation CMTS", Web Page, Dec. 2003, pp. 1-4, http://www.adc.com/Library/Literature/1279123.pdf.
Cisco Systems, Inc., "Advanced PHY Layer Technologies for High-Speed Data Over Cable", Web Page, pp. 1-18, http://www.cisco.com/warp/public/cc/so/neso/ns269/cchsd_wp.pdf.
Access Intelligence's Cable Group, "Market", Web Page, pp. 1-5, Jun. 2004 Issue, http://www.broadband-pbimedia.com/ct/archives/0604/0604_marketplace.html.
Broadcom Corporation, "Dual Universal Advanced TDMA/SCDMA PHY-Layer Burst Receiver", Web Page, pp. 1-2, http://www.broadcom.com/collateral/pb/3140-PB00-R.pdf.

* cited by examiner

*Primary Examiner*—Phuc H Tran
(74) *Attorney, Agent, or Firm*—Larry T. Cullen

(57) ABSTRACT

The present methods and systems provide spectrum management for enhancing upstream performance for cable networks. According to one embodiment, a method of enhancing upstream performance in a cable network includes the steps of measuring performance of an upstream channel at a first data signaling rate; determining whether the upstream channel supports a second data signaling rate based on the performance; and selectively transitioning to the second data signaling rate based on said determination. The second data signaling rate is a higher rate than the first data signaling rate.

38 Claims, 5 Drawing Sheets

SPECTRUM MANAGEMENT SYSTEMS AND METHODS FOR CABLE NETWORKS

RELATED APPLICATIONS

The present application claims priority under 35 U.S.C. § 119(e) from the following previously-filed Provisional Patent Application, U.S. Application No. 60/502,077, filed Sep. 11, 2003, entitled "Expanding Bandwidth Via Advanced Spectrum Management Techniques," and which is incorporated herein by reference in its entirety.

FIELD

The present methods and systems relate to telecommunications. More specifically, the present methods and systems relate to spectrum management for cable networks.

BACKGROUND

Data-Over-Cable Service Interface Specifications (DOCSIS®) are standards specifying protocols for transmitting signals over cable networks (e.g., cable-television (CATV) networks). DOCSIS ensures interoperability between cable operators' equipment and cable modems at subscriber locations. The first DOCSIS specification, DOCSIS 1.0, was designed to enable multi-vendor interoperability. DOCSIS 1.0 supports best-effort transmissions but does not offer the capability to guarantee performance of a given service. The following DOCSIS specification, DOCSIS 1.1, provided quality-of-service (QoS) features that went beyond best-effort services by enabling delivery of services that require more than best-effort transmission capabilities. DOCSIS 1.1 is fully backwards-compatible with DOCSIS 1.0, which allows DOCSIS 1.1 cable modems to coexist with already-deployed DOCSIS 1.1 equipment.

Recently, DOCSIS 2.0 has been approved and adopted by organizations that administer telecommunications standards (e.g., the International Telecommunications Union (ITU)). DOCSIS 2.0 certified equipment has been and is now being deployed in cable networks. DOCSIS 2.0 specifies several features that make it appealing over the earlier DOCSIS standards, including improved performance, increased throughput, and more efficient use of network capacity. For example, DOCSIS 2.0 specifies improved protection from impairments on CATV networks, increased support for transmit pre-equalization techniques, and advanced physical layer modulation techniques (Advanced Time Division Multiple Access (AT-DMA) and Synchronous Code Division Multiple Access (SCDMA)) that support higher modulation levels. A primary advantage of DOCSIS 2.0 is improved upstream performance. For example, DOCSIS 2.0 can triple the maximum upstream capacity offered by DOCSIS 1.1. DOCSIS 2.0 enables transmission across a 6.4 MegaHertz (MHz) channel and increases upstream performance to levels reaching bandwidths of 30.72 Megabits per second (Mbps) using 64 quadrature amplitude modulation (QAM) or 128 QAM and Trellis Coded Modulation (TCM).

While DOCSIS 2.0 provides improved performance over previous DOCSIS standards, migration from the previous DOCSIS standards to DOCSIS 2.0 is not free of technical and economic challenges. One significant concern is the effects that DOCSIS 2.0 equipment will have on the performance of already-deployed DOCSIS 1.0 and DOCSIS 1.1 (collectively "DOCSIS 1.x") equipment. Although DOCSIS 2.0 specifies backwards-compatibility with DOCSIS 1.x equipment for mixed mode operation, the DOCSIS 1.x equipment does not support DOCSIS 2.0. This results in additional overhead that will cause DOCSIS 1.x cable modems to experience degraded performance as DOCSIS 2.0 equipment is deployed.

Another significant concern results from the higher modulation rates supported by DOCSIS 2.0. Higher modulation rates require higher signal-to-noise ratios from the cable network. Standard DOCSIS 2.0 network equipment provides for the ability to measure signal-to-noise ratios (SNR) that would be required to transition to higher modulation rates specified in DOCSIS 2.0 (e.g., 64-QAM). However, the measurement techniques provided for in DOCSIS 2.0 are inherently flawed for higher modulation rates. For example, DOCSIS 2.0-specified measurement techniques cannot afford the time required to accurately measure channel performance for higher modulation rates because the conventional measurement techniques adversely affect performance levels on channels being measured. In other words, quality-of-service (QoS) and measurement accuracy are at odds with each other. If measurement accuracy is increased, QoS suffers, which can cause service disruptions, performance below guaranteed QoS, and customer dissatisfaction. Thus, measurement accuracy must be kept to a minimum to maintain QoS in conventional networks. Significantly, conventional DOCSIS 2.0 measurement techniques cannot afford to take the time required to obtain precise enough measurements that accurately predict performance and SNR margins at higher modulation rates. Because of this shortcoming, DOCSIS 2.0 specifies "fall back" procedures that return from a high modulation rate to a lower modulation rate when the high modulation rate fails due to inaccurate measurements.

To make matters worse, DOCSIS 2.0 measurement sequences are commonly performed using the active receiver and its configuration which may likely be quadrature phase shift keying (QPSK) (also referred to as 4-QAM). While QPSK measurements are sufficient to measure linear impairments, QPSK measurements cannot accurately estimate non-linearity in cable networks. This is fine for operating in QPSK, which is somewhat immune to network non-linearity. However, network non-linearity can preclude successful operation at higher modulation rates (e.g., 64-QAM and higher), which are much more susceptible to network non-linearity. As a result, conventional cable networks are not aware of and cannot operate at higher modulation rates in the presence of network non-linearity. Modulation rates are often forced to "fall back" to lower modulation rates because DOCSIS 2.0's limited QPSK measurement techniques cannot take the time to accurately measure upstream performance or to account for network non-linearity. Therefore, conventional DOCSIS 2.0 equipment does not fully utilize available bandwidth on upstream channels.

SUMMARY

The present methods and systems provide spectrum management for enhancing upstream performance for cable networks. According to one embodiment, a method of enhancing upstream performance in a cable network includes the steps of measuring performance of an upstream channel at a first data signaling rate; determining whether the upstream channel supports a second data signaling rate based on the performance; and selectively transitioning to the second data signaling rate based on said determination. The second data signaling rate is a higher rate than the first data signaling rate.

BRIEF DESCRIPTION OF THE DRAWINGS

The accompanying drawings illustrate various embodiments of the present method and system and are a part of the specification. Together with the following description, the drawings demonstrate and explain the principles of the present method and system. The illustrated embodiments are examples of the present method and system and do not limit the scope thereof.

Throughout the drawings, identical reference numbers designate similar, but not necessarily identical, elements.

DETAILED DESCRIPTION

The present specification describes systems and methods for advanced spectrum management. More specifically, the present systems and methods are configured to utilize spectrum management techniques to enhance performance levels (e.g., bandwidth and modulation rates) of upstream transmissions beyond the levels supported by conventional cable network equipment. This can be accomplished by performing detailed and coherent measurements of available SNR margins on upstream channels and increasing modulation rates and/or symbol rates to levels supported by the available SNR margins, thereby utilizing any identified available bandwidth. In particular, the systems and methods provide a parallel architecture that enable accurate measurements of upstream channel perform without affecting active channel transmissions or QoS. With the parallel architecture, measurements are made in the background with sufficient time to obtain accurate measurements that account for network non-linearity and accurately estimate SNR margins.

Further, the present systems and methods enable DOCSIS 1.x equipment to communicate upstream with increased throughput levels. Still further, the present systems and methods provide for migration from DOCSIS 1.x cable equipment to DOCSIS 2.0 cable equipment while leveraging already-deployed DOCSIS 1.x cable modems. Exemplary systems and methods will be described in further detail below.

In the following description, for purposes of explanation, numerous specific details are set forth in order to provide a thorough understanding of the present methods and systems for advanced spectrum management. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
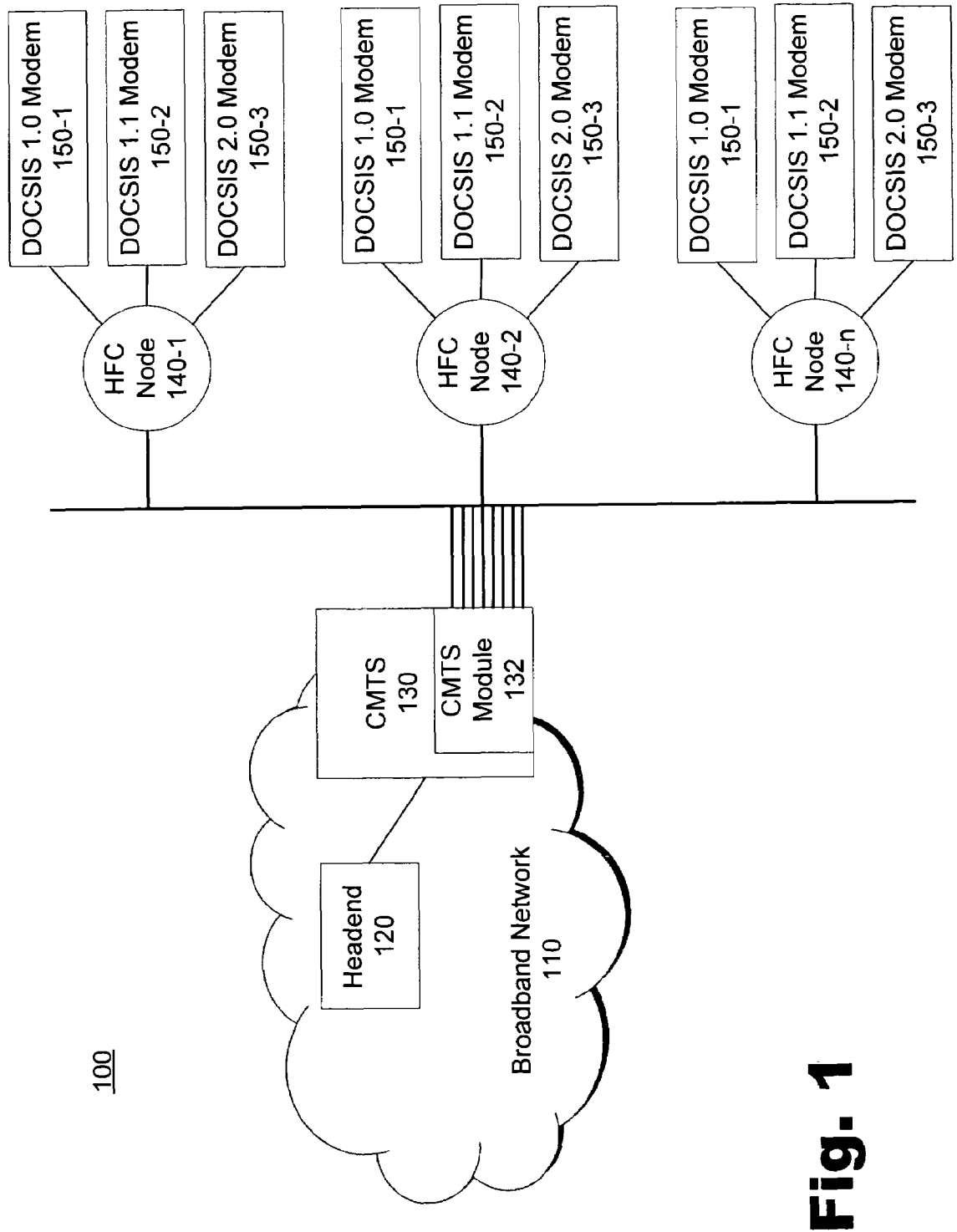
FIG. 1 is a block diagram illustrating a spectrum management system for a cable network, according to one embodiment.

FIG. 1 is a block diagram illustrating a spectrum management system (100) of a cable network, according to one embodiment. As shown in FIG. 1, the spectrum management system (100) can be communicatively coupled with a broadband network (110) having a headend (120). The spectrum management system (100) includes a cable modem termination system (CMTS) (130) with a CMTS module (132). The CMTS (130) is communicatively coupled to a number of hybrid fiber-coaxial cable (HFC) nodes (140-1, 140-2, ... 140-n) (collectively "HFC nodes 140"). The CMTS (130) and the HFC nodes (140) can be communicatively coupled by a fiber transport medium or by another transmission medium known to those skilled in the art. As shown in FIG. 1, the HFC nodes (140) are communicatively coupled to DOCSIS 1.0 cable modems (150-1), DOCSIS 1.1 cable modems (150-2), and DOCSIS 2.0 cable modems (150-3). These DOCSIS cable modems are collectively referred to as the "DOCSIS cable modems (150)." The HFC nodes (140) can be communicatively coupled to the DOCSIS cable modems (150) by a coaxial cable and/or other transmission medium suitable for carrying cable data signals.

The broadband network (110) can include any network or network devices providing or carrying broadband and/or other telecommunications services. Accordingly, the broadband network (110) can include a wide area network (WAN), local area network (LAN), metropolitan area network (MAN), an access network, a core network, and the like. Although not shown in FIG. 1, the broadband network (110) may be connected with providers of various types of services, including but not limited to voice-over-internet-protocol (VoIP) providers, internet service providers (ISP), and application service providers.

The headend (120) can include any cable operator. For example, the headend (120) may include a local cable operator (LCO) or a multi-service operation (MSO). The headend (120) can comprise a regional headend. The headend (120) typically transmits signals downstream toward subscriber locations, e.g., locations of particular DOCSIS modems (150), and receives signals upstream from the subscriber locations.

Signals between the headend (120) and DOCSIS modems (150) at subscriber locations travel through the CMTS (130) and the HFC nodes (140). As is known to those skilled in the art, the HFC node (140) provides a distribution point between the CMTS (130) and the DOCSIS modems (150). Downstream signals from the headend (120) typically travel over fiber mediums to the HFC node (140). At the HFC node (140), the signals are prepared for distribution to the DOCSIS cable modems (150) over coaxial cable mediums. Similarly, conversions from coaxial cable to optical fibers can be performed for upstream signals.

As those skilled in the art will appreciate, DOCSIS cable modems (150) can include any cable modem capable of operating with DOCSIS signals, including DOCSIS 1.0, DOCSIS 1.1, and/or DOCSIS 2.0 type signals. DOCSIS cable modems (150) may be located at a subscriber location, such as a residence, business, or other location.

The CMTS (130) provides connectivity devices and functions for communicatively coupling the broadband network (110) with the DOCSIS cable modems (150). The CMTS (130) can include but is not limited to a radio-frequency (RF) matrix switch, an HFC network interface, a tunable RF upconverter, downstream transmitters, upstream receivers, and devices known in the art helpful for providing communications between the broadband network (110) and the DOCSIS cable modems (150). The CMTS (130) is configured to function in mixed mode according to DOCSIS 2.0 specifications to support DOCSIS 1.x and DOCSIS 2.0 cable modems (150). In one embodiment, the CMTS (130) is employed as part of a BSR 64000 carrier-class CMTS/edge router provided by Motorola, Inc. of Schaumburg, Ill.

As shown in FIG. 1, the CMTS (130) includes a CMTS module (132). The CMTS modules (132) should be configured to operate according to DOCSIS 2.0 standards.

Figure 2:
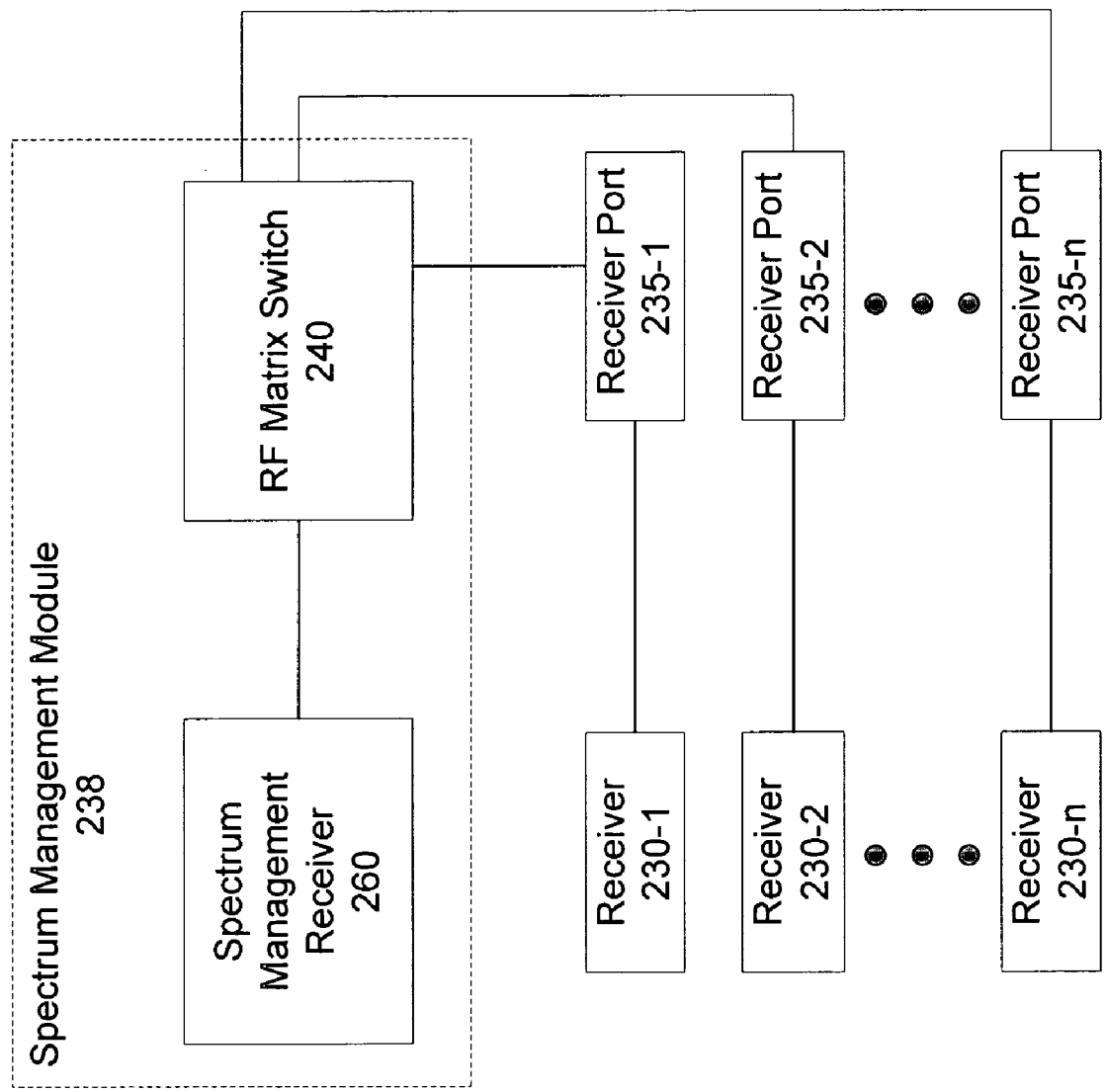
FIG. 2 is a block diagram illustrating components of the cable modem termination system (CMTS) module of FIG. 1, according to one embodiment.

FIG. 2 is a block diagram illustrating components of the CMTS module (132) of FIG. 1, according to one embodiment. As shown in FIG. 2, the CMTS module (132) can include a number of receivers (230-1, 230-2, ... 230-n) (collectively "receivers 230") communicatively coupled to a number of receiver ports (235-1, 235-2, ... 235-n) (collectively "receiver ports 235"). The receivers 230 are configured to receive upstream signals via the receiver ports 235.

The CMTS module (132) further includes a spectrum management module (238) having a radio frequency (RF) matrix switch (240) and a spectrum management receiver (260). The (RF) matrix switch (240) is capable of switching between the receiver ports (235). The RF matrix switch (240) is communicatively coupled to the spectrum management receiver (260) such that when the RF matrix switch (240) connects to a selected receiver port (235), the spectrum management receiver (260) is in effect coupled in parallel, in a transparent bridging fashion, with the particular receiver (230) associated with the selected receiver port (235). Accordingly, the spectrum management receiver (260) and the particular receiver (230) are configured to receive upstream data from a cable modem (150; FIG. 1) configured to transmit to the selected receiver port (235).

The CMTS module (132) can include logics that can be executed by the CMTS module (132) to perform any of the processes or techniques disclosed herein. The logics can be in the form of software, middleware, firmware, embedded logic, or other forms known to those skilled in the art. The CMTS module (132) can further include processor(s) and/or other devices capable of executing the logics.

With the spectrum management receiver (260) connected in a parallel architecture with the receivers (230), the CMTS module (132) can monitor the performance on any one of the upstream receiver ports (235) generally without affecting the performance of active upstream channels. The spectrum management receiver (260) can non-obtrusively gain access to any of the HFC nodes (140; FIG. 1) (i.e., return nodes) connected to one of the receiver ports (235) and perform tests on any available DOCSIS modem (150; FIG. 1) connected to the HFC nodes (140; FIG. 1). The spectrum management receiver (260) can access mapping information as well as lists of the DOCSIS cable modems (150) that are available to any of the receiver ports (235) that are connected to the spectrum management receiver (260).

Because of the parallel architecture of the spectrum management receiver (260) with the receiver ports (235), the spectrum management module (238) is able perform detailed, lengthy, and coherent measurements and analysis of upstream channel performance even while the receiver port (235) being monitored is performing its functions at full capacity. In particular, the spectrum management module (238) connected in parallel has the luxury of time for performing coherent and detailed signal-to-noise (SNR) measurements, as well as longer Fast Fourier Transform (FFT) measurements with better resolution. Further, the traffic on any of the receiver ports (235) can be measured continuously and in real-time without affecting the transmissions on the receiver ports (235).

The spectrum management receiver (260) can be configured to perform measurements of upstream channels by determining which of the DOCSIS cable modems (150; FIG. 1) are most representative of a return path under evaluation and then use the identified DOCSIS cable modems (150; FIG. 1) to make signal quality measurements. The spectrum management receiver (260) can utilize any idle DOCSIS cable modem (150; FIG. 1) and instruct it to transmit signals that can be used by the spectrum management receiver (260) to measure performance of the return path. This can be done by issuing a dynamic channel change (DCC) command instructing the DOCSIS cable modem (150; FIG. 1) to move to a specific carrier frequency. Once on the new carrier frequency, the spectrum management receiver (260) can issue standard DOCSIS control information to inform the DOCSIS cable modem (150; FIG. 1) of transmission parameters (e.g., modulation type, modulation rate, symbol rate, transmit preamble length, transmit preamble type, coefficients for equalization, coefficients for noise cancellation, etc.). The DOCSIS cable modem (150; FIG. 1) is then instructed to transmit a preamble followed by a specific data pattern (i.e., known as a unique word in DOCSIS specifications) that the spectrum management receiver (260) has issued to the DOCSIS cable modem (150; FIG. 1).

The spectrum management receiver (260) receives the transmissions from the DOCSIS cable modem (150; FIG. 1) and makes a performance assessment based on the transmissions. The spectrum management receiver (260) may instruct the DOCSIS cable modem (150; FIG. 1) to send any number or repetitions of transmissions to gather sufficient information to achieve a predetermined confidence level for the performance assessment. The CMTS module (132) can be configured to perform such monitoring functions using methods and devices disclosed in U.S. Pat. No. 6,757,253 to Cooper et al., issued Jun. 29, 2004 and assigned to Motorola, Inc. of Schaumburg, Ill., the contents of which are hereby incorporated by reference in their entirety.

With the measurements obtained from the transmissions, the spectrum management receiver (260) is able to determine whether the return path being evaluated exhibits sufficient signal-to-inter-symbol interference (ISI), which is commonly referred to as signal-to-noise ratio (SNR) and more accurately referred to as modulation error ratio (MER), to support a particular data signaling rate. A data signaling rate is determined by two factors: the level of quadrature amplitude modulation (QAM) generated by the DOCSIS cable modem (150; FIG. 1) and received by the CMTS module (132; FIG. 1); and the symbol rate (also referred to as modulation rate) utilized. The QAM level can range from 4-QAM (QPSK), which transmits two bits of information every symbol period, up to 256-QAM, which transmits eight bits of information every symbol period. The symbol rates for DOCSIS 2.0 specifications include 160 ksym/s (bandwidth=200 kHz), 320 ksym/s (bandwidth=400 kHz), 640 ksym/s (bandwidth=800 kHz), 1280 ksym/s (bandwidth=1600 kHz), 2560 ksym/s (bandwidth=3200 kHz), and 5120 ksym/s (bandwidth=6400 kHz). The spectrum management receiver (260) can use the measurements to determine the SNR margin and the bandwidth available on a channel, and specifically whether a channel has up to 6.4 MHz of bandwidth available for DOCSIS 2.0 signaling.

The spectrum management receiver (260) can evaluate dynamic ranges of the return path to enable transmissions over the return path at levels up to 256-QAM for DOCSIS enhanced mode equipment. This can be done by using the measurements described above to determine the effects of impairments on signal transmitted over the return path. The spectrum management receiver (260) can analyze measurements of the return path to qualify any area of the return path for maximum data signaling rates.

As those skilled in the art will appreciate, different types of impairments can affect signals transmitted upstream in a cable network. Examples of such impairments include ingress noise, impulse noise, common path distortion (CPD), micro-reflections, amplitude distortion, diplex filter distortion, thermal noise, and group delay distortion. Many characteristics of these impairments, including their sources, ranges, and effects are known to those skilled in the art. More often than not, these different types of impairments are present in various combinations on a cable network. Accordingly, it is not very useful to measure the effects of a single impairment type alone.

The parallel architecture of the spectrum management receiver (260) provides the capability to measure the combined effects and interrelationships of the impairments without imposing increased demands and bandwidth degradations on channels being measured. The spectrum management receiver (260) can use measurements of the combined effects of noise to determine the nature and extent of the types of impairments that are present. Dominant impairment types can be identified, including any particular impairments that are particularly troublesome to high-rate QAM modes (e.g., 64-QAM). This can be accomplished by taking measurements with different combinations of CMTS (130; FIG. 1) functions enabled or disabled. For example, the spectrum management receiver (260) can determine a modulation error ratio (MER) for a particular return channel with an equalizer feature and an ingress noise canceller feature enabled and set at specific coefficient settings. The spectrum management receiver (260) can then repeat the process of measuring signals transmitted by the DOCSIS cable modem (150; FIG. 1) with a different combination of features enabled or disabled and set at a different set of coefficient settings. For example, one of or both the equalizer and ingress noise canceller features may be disabled for another round of measurements. During this round of testing, the spectrum management receiver (260) may instruct the DOCSIS cable modem (150; FIG. 1) to switch to QPSK. The spectrum management receiver (260) can then compare the measurements taken with different settings to identify and quantify the effects of particular types of impairments. This allows the spectrum management receiver (260) to accurately assess the nature of the impairments present on the return path.

The spectrum management receiver (260) can also be configured to analyze the entire return path using only QPSK. This testing mode is designed to identify generalized impairments that may or may not exist at every carrier frequency. This testing mode can be performed quickly to provide measurements for rapid compensation measures.

Upon completion of the testing described above for a particular carrier frequency, the spectrum management receiver (260) may instruct the DOCSIS cable modem (150; FIG. 1) to move to another frequency so that the testing process can be repeated. In this manner, a sweep of all available carrier frequencies can be performed to determine the impairment characteristics of the return path per carrier frequency.

The impairment-per-carrier-frequency characteristics will have a time stamp element indicating the time of the measurements. Thus, the system (100; FIG. 1) can determine dominant impairments based not only on carrier frequency but also on the time of day that the impairments were measured. This allows the system (100; FIG. 1) to recognize and compensate for impairments that vary over the time of day. For example, ingress noise may be the dominant impairment during a particular time period (e.g., daylight or normal working hours) due to increased interference sources, and another type of impairment may become the dominant impairment during other time periods (e.g., night) when outside interference sources typically become less prevalent.

When testing of the DOCSIS cable modem (150; FIG. 1) is completed, the spectrum management receiver (260) may repeat the tests on the same modem (150; FIG. 1) or instruct the modem (150; FIG. 1) to return to its main channel. The measurement cycle can be performed again on the same or a different receiver port (230).

During testing, if the DOCSIS cable modem (150; FIG. 1) becomes busy due to a customer wishing to use the modem (150; FIG. 1), the spectrum management receiver (260) can immediately instruct the modem (150; FIG. 1) to return to its main channel.

Upon completion of the testing described above, the CMTS module (132) can implement steps to enhance performance based on the testing. For example, the spectrum management receiver (260) may instruct the DOCSIS cable modem (150; FIG. 1) to switch to another carrier frequency (i.e., hop frequencies) or channel that is available and that may provide better performance or more bandwidth. Alternatively, the CMTS module (132) can compensate for measured noise by implementing or adjusting advanced noise cancellation functions. The CMTS module (132) can tailor the noise cancellation features based on the measured performance. Thus, the spectrum management receiver (260) is able to assess the total impact of diverse types of noise on network performance and bandwidth availability and implement compensation steps based on the assessments to enhance performance and enable new cable services. The measurement and compensation of noise caused by impairments can be performed in real-time using advanced noise cancellation and avoidance functions provided for in the DOCSIS 2.0 specifications, which are supported by the CMTS (130; FIG. 1).

DOCSIS 2.0 specifies a number of functions that the system (100) can utilize to compensate for measured noise to optimize performance, including throughput. DOCSIS 2.0 provides advanced physical layer modulation protocols: Advanced Time Division Multiplexing (ATDMA) and Synchronous Code Division Multiple Access (SCDMA). These protocols allow cable operators to run at higher modulation levels and to fine-tune physical layer parameters. For example, DOCSIS 2.0 provides enhanced management of the RF spectrum, which enables the system (100; FIG. 1) to efficiently cancel and/or avoid noise by changing the QAM level or carrier frequency. The CMTS (132; FIG. 1) can include an RF analog front end that supports comprehensive frequency adjustment capabilities to avoid impairments.

DOCSIS 2.0 specifications further provide higher symbol rates, improved error correction (16 correctable symbols), enhanced equalization capabilities using a 24-tap equalizer, statistical multiplexing, forward error correction (FEC), byte interleaving, frame interleaving, adaptive noise cancellation techniques, ingress noise cancellation techniques, pre-equalization techniques, per-burst post-equalization techniques, CDMA spreading, and higher modulation rates. These functions as specified in the DOCSIS 2.0 standards result in improved signal-to-noise ratios that enable higher modulation rates to be utilized for upstream transmissions. DOCSIS 2.0 further specifies a mixed mode of operation that supports DOCSIS 1.x and DOCSIS 2.0 equipment. Any or all of these functions can be implemented in the CMTS module (132). In one embodiment, the CMTS module (132) is based on BCM-3138, BCM-3140 burst demodulators for the DOCSIS physical layer return path and BCM-3212 and BCM-3214 chip sets for the DOCSIS MAC layer. These demodulators/chip sets are available from Broadcom Corporation of Irvine, Calif.

The functions specified in the DOCSIS 2.0 standard can be used to optimize channel efficiency and performance based on measurements obtained by the spectrum management receiver 260. The CMTS module (132) can be configured to automatically compensate for measured noise or other impairments using the functions provided for in the DOCSIS 2.0 standards. By adjusting noise cancellation/avoidance functions based on measured noise, the CMTS module (132) provides a number of enhanced or new features, as well as increased performance levels (e.g., throughput) for the upstream path. The highly accurate measurement, noise cancellation, and post-equalization techniques can be performed by the CMTS module (132) to allow signals to be transmitted across the upstream links at higher modulation rates, which helps increase throughput performance on upstream channels.

The CMTS module (132) can perform ingress noise cancellation and post-equalization techniques based on measured performance information. Because the measured performance information takes into account the many different types of noise and impairments that affect upstream channels, the CMTS (132) enables highly accurate cancellation and post-equalization results. This high level of accuracy cannot be achieved by other DOCSIS 2.0 devices that do not take into account the multiple different types of impairments and their interplay on the upstream channels. By implementing these techniques, the CMTS module (132) can generally support operation of DOCSIS 1.x cable modems (150; FIG. 1) in 16 QAM mode virtually anywhere that operation in QPSK is possible. Operation in 16 QAM mode generally increases upstream throughput for DOCSIS 1.x cable modems (150; FIG. 1) by at least fifty percent. With higher throughput capabilities, the system (100; FIG. 1) equips operators with advanced tools for providing customers with increased billable bandwidth without network build-out and higher-speed, tiered, and/or new broadband services.

The CMTS module (132) is configured to perform per-burst equalization according to DOCSIS 2.0 specifications, which enables the receivers (230) to equalize channel signals, thereby correcting for the effects of impairments, including micro-reflections, amplitude distortion, and group delay distortion. These impairments have historically prevented operation with a QAM modulation rate higher than 4-QAM (QPSK).

The system (100; FIG. 1) further provides for transitioning to DOCSIS 2.0 without introducing performance overhead. The CMTS module (132) can be configured to implement ATDMA receiver technology that is directly compatible with DOCSIS 1.x equipment. Thus, the CMTS module (132) is configured for operation in true DOCSIS 1.x mode, which does not impose additional overhead on DOCSIS 1.x cable modems (150; FIG. 1), even in mixed-mode operation. This allows cable operators to deploy and/or support DOCSIS 2.0 equipment without introducing additional overhead on already-deployed DOCSIS 1.x cable modems (150; FIG. 1).

With the measurement and compensation techniques described above implemented in the CMTS module (132), the system (100; FIG. 1) can provide throughput levels that utilize available SNR margins and bandwidth on upstream channels. As mentioned above, DOCSIS 2.0 specifies throughput rates up to 30.72 Mbps in 64-QAM or 128-TCM QAM mode. However, conventional cable network equipment cannot perform accurate enough measurements of upstream channel performance to maximize utilization of available bandwidth and SNR margins. This is because convention equipment measurement techniques affect active transmissions and cannot accurately measure SNR margins on a channel without affecting or compromising the measurements. Accordingly, conventional network equipment must operate at lower modulation rates (e.g., 16-QAM) that can operate at lower SNR levels.

Because of the measurement and compensation techniques described above, the CMTS module (132) can be configured to determine available SNR margins on a channel and increase data signaling settings to maximize utilization of the available SNR margins and bandwidth. Accordingly, the CMTS module (132) can identify SNR margins that support data signaling at up to 256-QAM to achieve 40.96 Mbps throughput rates. To enable operations at higher throughput levels, the system (100; FIG. 1) provides improved signal-to-noise ratios (SNR) analysis over return channels for DOCSIS 1.0, 1.1, and 2.0 equipment by coherently measuring performance in the background with the parallel architecture of the spectrum management receiver (260). SNR margins are accurately determined because the spectrum management receiver (260) does not adjust active transmission settings or introduce additional loads on the active channel being measured.

Once the spectrum management module (238) determines that an SNR margin is available that will support a higher data signal that what is being measured, the CMTS module (132) can implement steps to utilize the available bandwidth. The CMTS module (132) can be configured to notify the cable operator of the available bandwidth so that the cable operator can transition to a higher data signal. The CMTS module (132) is also able to adjust settings for the active transmissions over the receiver port (235) being measured. This can be done by notifying the CMTS (130; FIG. 1) of the available bandwidth and/or instructing the DOCSIS cable modem (150; FIG. 1) transmitting to the active receiver port (235) to transition to a higher data signal by using a higher QAM mode and/or increasing the symbol rate for transmissions.

The system (100) can instruct the DOCSIS cable modem (150; FIG. 1) being used for testing to transmit at a higher data signal and then repeat the measurement process described above to determine if adequate SNR margins are available to support an even higher data signaling rate. If adequate SNR margins are determined to be available, the CMTS (132) will again implement steps to utilize the available bandwidth. In this manner, the system (100) maximizes use of available bandwidth and causes data signaling rates to "fall forward" to the highest data signaling rate that can be supported by an upstream channel. In some embodiments, the data signaling rate may reach up to 256-QAM in cable networks having equipment that supports this QAM constellation. The highly accurate and robust measurements that are enabled by the parallel and dedicated spectrum management receiver (260) allow the system (100; FIG. 1) to recognize the highest data signaling rate that can be supported by an upstream channel, which signaling rate can be implemented to increase throughput.

Further, the system (100; FIG. 1) is able to determine optimum settings or parameters for an active receiver (230) without adjusting the settings of the active receiver (230). In other words, because measurements are made on a parallel channel representative of an active upstream channel, the system (100; Figure) can adjust settings on the parallel channel to determine optimum settings for the active receiver (230). This enables parameters to be set before any change is made to the active channel's carrier frequency or bandwidth.

Once the optimum settings are determined by the spectrum management receiver (260), the system (100; FIG. 1) is able to implement those settings on the active receiver (230) to maximize throughput over the active channel.

Figure 3:
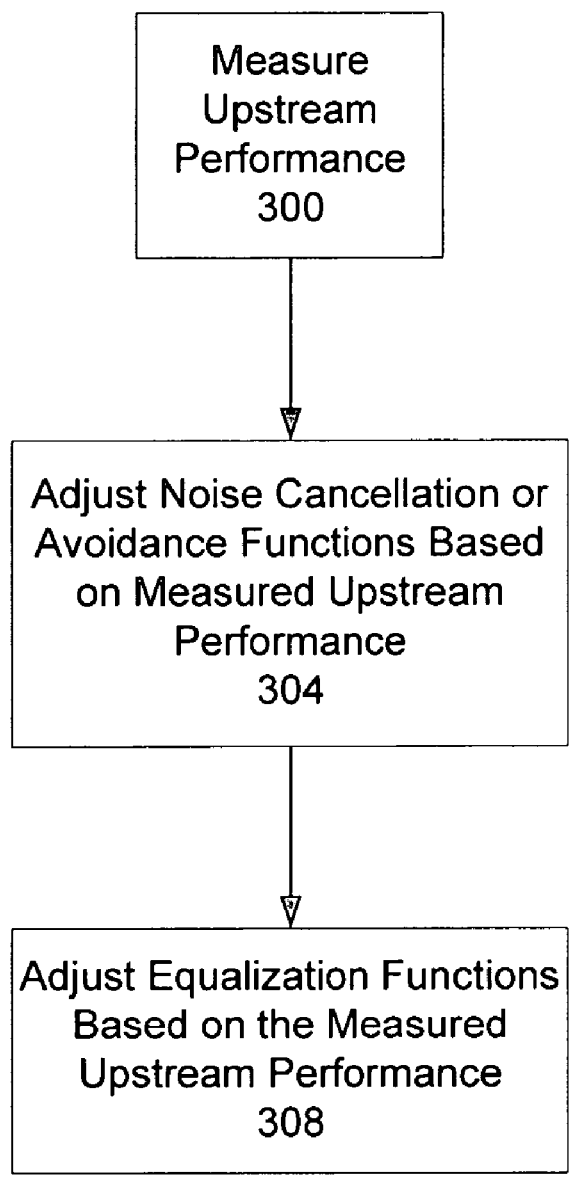
FIG. 3 is a flowchart diagram illustrating a method for spectrum management, according to one embodiment.

FIG. 3 is a flowchart diagram showing a method for improving bandwidth capacity and throughput performance on an upstream channel, according to one embodiment. At step (300), performance of the upstream channel is measured using any of the techniques discussed above. At step (304), noise cancellation or avoidance functions discussed above are adjusted based on the measured performance of the upstream channel. For example, ingress noise cancellation parameters may be adjusted to produce cancellation actions that effectively cancel out measured ingress noise. At step (308), equalization functions are adjusted base on the measured performance of the upstream channel. Thus, channels are equalized in a manner that is tailored to compensate for the current effects of noise on the channel being measured. These steps can be performed using any of the techniques and devices discussed above to help improve the signal-to-noise ratio on the upstream channel.

Figure 4:
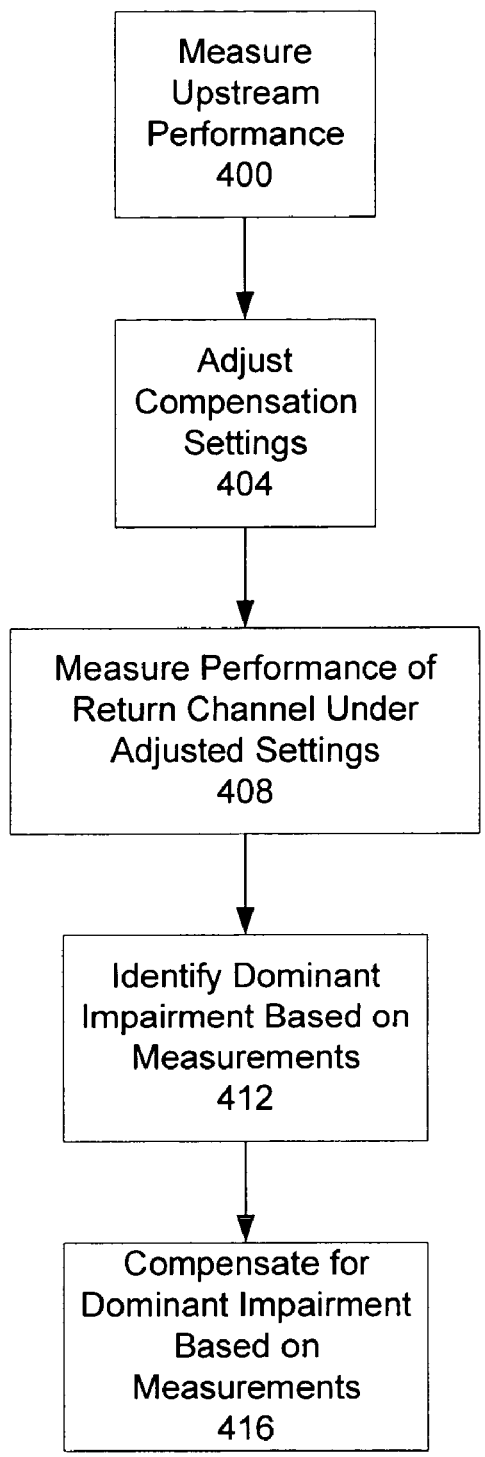
FIG. 4 is a flowchart diagram illustrating a method for identifying and compensating for a dominant impairment on a return channel, according to one embodiment.

FIG. 4 is a flowchart diagram showing a method for compensating for a dominant impairment of a cable network at any given time. At step (400), upstream performance of a channel is measured with specific feature settings enabled or disabled. At step (404), the settings are adjusted to a different combination of settings. At step (408), the performance of the return channel is measured again, but with a different set of features enabled and/or disabled. At step (412), a dominant impairment is identified based on the measurements made under two different groups of feature settings. At step (416), the dominant impairment is compensated for based on the measured performances of the upstream channel. These steps can be performed using any of the techniques described above.

Figure 5:
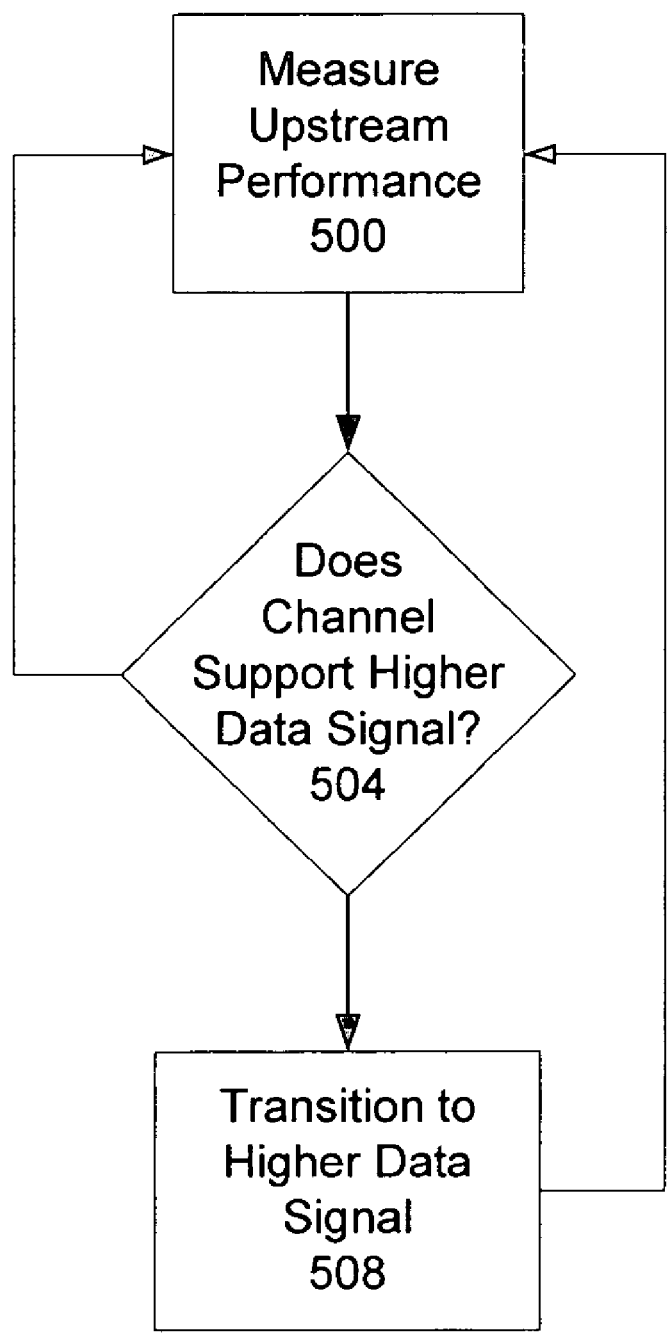
FIG. 5 is a flowchart diagram illustrating a method for transitioning to a higher data signaling rate based on measured upstream channel performance, according to one embodiment.

FIG. 5 is a flowchart diagram illustrating a method for transitioning to a higher data signaling rate based on measurement upstream channel performance, according to one embodiment. At step (500), the spectrum management receiver (260; FIG. 2) measures upstream channel performance in any of the ways discussed above. At step (504), it is determined whether the upstream channel supports a higher data signaling rate than the rate being used for the measurements in step (500). This determination can be based on SNR margins as discussed above. If it is determined at step (504) that the channel will not support a higher data signaling rate, processing moves to step (500), at which step further measurements of upstream performance can be obtained. On the other hand, if it is determined at step (504), that the channel will support a higher data signaling rate, processing continues at step (508). At step (508), the system (100; FIG. 1) implements a transition to a higher data signaling rate. Processing then moves to step (500), at which step further measurements of upstream performance can be obtained, including measurements performed using the higher signaling rate that was transitioned to in step (508). Through this process, the system (100; FIG. 1) can implement the highest data signaling rate that can be supported by an upstream channel. These steps can be performed using any of the techniques described above.

According to one exemplary embodiment, the present systems and methods described above may be implemented as a computer readable carrier. Program(s) of the computer readable carrier define functions of embodiments and can be contained on a variety of signal-bearing media, which include, but are in no way limited to, information permanently stored on non-writable storage media (e.g., read-only memory devices within a computer such as CD-ROM or DVD-ROM disks readable by a CD-ROM drive or a DVD drive); alterable information stored on writable storage media (e.g., floppy disks within a diskette drive or hard-disk drive or read/writable CD or read/writable DVD); or information conveyed to a computer by a communications medium, such as through a computer or telephone network, including wireless communications. The latter embodiment specifically includes information downloaded from the Internet and other networks. Such signal-bearing media or computer readable carriers, when carrying computer-readable instructions that direct functions of the present system and method, represent embodiments of the present system and method.

In conclusion, the present systems and methods present a number of ways to provide enhanced performance over a mixed-mode cable network by managing spectrum. More specifically, the present systems and methods are configured to enhance performance levels of upstream transmissions by recognizing and maximizing utilization of available bandwidth and SNR margins on upstream channels. Further, the present systems and methods enable DOCSIS 1.x cable modems to transmit upstream with increased throughput levels. Still further, the present systems and methods provide for migration from DOCSIS 1.x cable equipment to DOCSIS 2.0 cable equipment while leveraging already-deployed DOCSIS 1.x cable modems. These enhancements are enabled by the ability to robustly and coherently measure performance of a return channel and then utilize DOCSIS 2.0-specified functions to compensate for impairments identified by the measurements of performance.

The preceding description has been presented only to illustrate and describe the present method and system. It is not intended to be exhaustive or to limit the present method and system to any precise form disclosed. Many modifications and variations are possible in light of the above teaching.

The foregoing embodiments were chosen and described in order to illustrate principles of the method and system as well as some practical applications. The preceding description enables others skilled in the art to utilize the method and system in various embodiments and with various modifications as are suited to the particular use contemplated. It is intended that the scope of the method and system be defined by the following claims.

What is claimed is:

1. A method of enhancing upstream performance in a cable network, the method comprising:
measuring performance of an upstream channel at a first data signaling rate;
determining whether said upstream channel supports a second data signaling rate based on said performance, said second data signaling rate being a higher rate than said first data signaling rate; and
selectively transitioning an active channel to said second data signaling rate based on a determination of whether said active channel supports the second data signaling rate, wherein the determination of whether said active channel supports the second data signaling rate is made based on said determination of whether said upstream channel supports the second data signaling rate and said upstream channel is different from the active channel and is representative of the active channel in the determination of whether said active channel supports the second data signaling rate.

2. The method of claim 1, wherein said step of measuring is performed without affecting transmissions on said active channel.

3. The method of claim 1, further comprising selectively transitioning said upstream channel to said second data signaling rate based on said determination of whether said upstream channel supports the second data signaling rate.

4. The method of claim 3, wherein said step of implementing includes setting operation parameters for said active channel prior to adjusting carrier frequency or bandwidth of said active channel.

5. The method of claim 3, wherein said step of measuring includes adjusting transmission parameters for transmissions on said upstream channel.

6. The method of claim 1, wherein said second data signaling rate includes a 256 quadrature amplitude modulation (QAM) constellation.

7. The method of claim 1, wherein said step of measuring includes determining available signal-to-noise ratio (SNR) margins on said upstream channel, and said step of determining is based on said available SNR margins.

8. The method of claim 1, wherein said performance includes a measurement of network non-linearity.

9. A method of managing upstream spectrum in a cable network, the method comprising:
monitoring performance parameters of transmissions over an upstream channel, said performance parameters being representative of noise introduced into said transmissions; and
compensating an active channel for effects of said noise based on determined performance parameters of the active channel, wherein the performance parameters of the active channel are determined based on said monitored performance parameters of transmissions over the upstream channel and said upstream channel is representative of the active channel in determining the performance parameters of the active channel.

10. The method of claim 9, wherein said step of monitoring includes:
determining a first set of said performance parameters with a first configuration of noise compensation feature settings; and
determining a second set of said performance parameters with a second configuration of noise compensation feature settings.

11. The method of claim 10, wherein an ingress noise canceller is enabled for said step of determining said first set of said performance parameters, and said ingress noise canceller is disabled for said step of determining said second set of said performance parameters.

12. The method of claim 10, further comprising:
identifying a dominant impairment based on said first set of said performance parameters and said second set of said performance parameters.

13. The method of claim 9, wherein said step of compensating includes canceling said noise in real-time.

14. The method of claim 9, wherein said step of canceling includes canceling ingress noise.

15. The method of claim 9, further comprising equalizing amplitude to compensate for at least one of amplitude distortions, group-delay distortions, and micro-reflections.

16. The method of claim 15, wherein said step of equalizing includes executing post-equalization techniques.

17. The method of claim 15, wherein said step of equalizing includes executing pre-equalization techniques.

18. The method of claim 9, wherein said performance parameters include an indication of network non-linearity.

19. A system for managing upstream performance in a cable network, the system comprising:
an active receiver connected to an active channel; and
a spectrum management receiver connected in parallel with said active receiver; said spectrum management receiver being configured to:
measure performance of an upstream channel at a first data signaling rate; and
determine whether the active channel supports a second data signaling rate based on determined performance of the upstream channel, wherein said second data signaling rate is a higher rate than said first data signaling rate, the determination of whether the active channel supports the second data signaling rate is made based on the measured performance of the upstream channel, the upstream channel is different from the active channel, and the upstream channel is representative of the active channel in the determination of whether the active channel supports the second data signaling rate.

20. The system of claim 19, wherein said spectrum management receiver is further configured to selectively cause a transition to said second data signaling rate on said active channel based on said determination.

21. The system of claim 20, wherein said active receiver includes operation parameters, and wherein said spectrum management receiver is configured to instruct said active receiver to change said operation parameters prior to said active receiver adjusting carrier frequency or bandwidth.

22. The system of claim 19, wherein said performance of said upstream channel is measured without affecting transmissions on said active channel.

23. The system of claim 19, wherein said second data signaling rate includes a modulation rate of 256 quadrature amplitude modulation (QAM).

24. The system of claim 19, wherein said performance is based on available signal-to-noise ratio (SNR) margins on said upstream channel.

25. The system of claim 19, wherein said performance accounts for network non-linearity.

26. A spectrum management module configured to be connected in parallel with an active receiver connected to an active channel of a cable network, comprising:
an RF switch; and
a spectrum management receiver configured to be connected in parallel with the active receiver via said RF switch, said spectrum management receiver being configured to:
measure performance of an upstream channel at a first data signaling rate; and
determine whether an active channel supports a second data signaling rate based on determined performance of the active channel, wherein said second data signaling rate is a higher rate than said first data signaling rate, the determination of whether the active channel supports the second data signaling rate is made based on the measured performance of the upstream channel, the upstream channel is different from the active channel, and the upstream channel is representative of the active channel in the determination of whether the active channel supports the second data signaling rate.

27. The spectrum management module of claim 26, wherein said spectrum management receiver is further configured to selectively cause a transition to said second data signaling rate on the active channel based on said determination.

28. The spectrum management module of claim 27, wherein said spectrum management receiver is configured to instruct the active receiver to change operation parameters prior to the active receiver adjusting carrier frequency or bandwidth.

29. The spectrum management module of claim 26, wherein said spectrum management receiver is configured to measure said performance of said upstream channel without affecting transmissions on the active channel.

30. The spectrum management module of claim 26, wherein said second data signaling rate includes a 256 quadrature amplitude modulation (QAM) constellation.

31. The spectrum management module of claim 26, wherein said performance is based on available signal-to-noise ratio (SNIR) margins on said upstream channel.

32. The spectrum management module of claim 26, wherein said performance is based on non-linearity on said upstream channel.

33. A processor readable medium having instructions thereon for enhancing upstream performance in a cable network, said instructions being configured to instruct a processor to perform the steps of:
    measuring performance of an upstream channel at a first data signaling rate;
    determining whether said upstream channel supports a second data signaling rate based on said performance, said second data signaling rate being a higher rate than said first data signaling rate; and
    selectively transitioning an active channel to said second data signaling rate based on a determination of whether the active channel supports the second data signaling rate, wherein said determination of whether the active channel supports the second data signaling rate is made based on said determination of whether said upstream channel supports the second data signaling rate and said upstream channel is different from the active channel and is representative of the active channel in said determination of whether the active channel supports the second data signaling rate.

34. The processor-readable medium of claim 33, wherein said step of selectively transitioning includes implementing said second data signaling rate on said active channel if said upstream channel is determined to support said second data signaling rate.

35. The processor-readable medium of claim 34, wherein said step of implementing includes setting operation parameters for said active channel prior to adjusting carrier frequency or bandwidth of said active channel.

36. The processor-readable medium of claim 33, wherein said step of measuring includes adjusting transmission parameters for transmissions on said upstream channel.

37. The processor-readable medium of claim 33, wherein said step of measuring includes determining available signal-to-noise ratio (SNR) margins on said upstream channel, and said step of determining is based on said available SNIR margins.

38. The processor-readable medium of claim 33, wherein said step of measuring includes estimating non-linearity on said upstream channel.

\* \* \* \* \*